US012499754B2

(12) United States Patent
Schultz

(10) Patent No.: US 12,499,754 B2
(45) Date of Patent: Dec. 16, 2025

(54) VEHICLE, COMPUTER PROGRAM, APPARATUS AND METHOD FOR A VEHICLE

(71) Applicant: VOLKSWAGEN AKTIENGESELLSCHAFT, Wolfsburg (DE)

(72) Inventor: Holger Schultz, Falkensee (DE)

(73) Assignee: VOLKSWAGEN AKTIENGESELLSCHAFT

( * ) Notice: Subject to any disclaimer, the term of this patent is extended or adjusted under 35 U.S.C. 154(b) by 377 days.

(21) Appl. No.: 18/256,105

(22) PCT Filed: Oct. 7, 2021

(86) PCT No.: PCT/EP2021/077766
§ 371 (c)(1),
(2) Date: Dec. 7, 2023

(87) PCT Pub. No.: WO2022/096219
PCT Pub. Date: May 12, 2022

(65) Prior Publication Data
US 2025/0201113 A1 Jun. 19, 2025

(30) Foreign Application Priority Data
Nov. 9, 2020 (DE) ...................... 10 2020 214 058.8

(51) Int. Cl.
*G08G 1/01* (2006.01)
*G08G 1/0967* (2006.01)
(Continued)

(52) U.S. Cl.
CPC ......... *G08G 1/0141* (2013.01); *G08G 1/0112* (2013.01); *G08G 1/096791* (2013.01); *H04L 69/14* (2013.01); *H04W 4/40* (2018.02)

(58) Field of Classification Search
CPC ............ G08G 1/096791; G08G 1/166; H04B 17/318; G01S 13/589; H04W 4/40;
(Continued)

(56) References Cited

U.S. PATENT DOCUMENTS 9,187,091 B2 * 11/2015 Mills ................... B60W 40/107
10,685,561 B2 * 6/2020 Zydek ................... B60W 30/00
(Continued)

FOREIGN PATENT DOCUMENTS

CN 109421731 A 3/2019
CN 110770707 A 2/2020
(Continued)

OTHER PUBLICATIONS

Allig et al.;Trustworthiness Estimation of Entities within Collective Perception; IEEE Vehicular Networking Conference (VNC); 2019.
(Continued)

*Primary Examiner* — Yuri Kan
(74) *Attorney, Agent, or Firm* — BARNES & THORNBURG LLP

(57) ABSTRACT

A transportation vehicle, computer program, apparatus and method for a transportation vehicle. The method includes receiving a first piece of information and a second piece of information about the surroundings of the transportation vehicle via a first communication connection and a third piece of information and a fourth piece of information about the surroundings of the transportation vehicle via a second communication connection. The first and the third piece of information are different from one another. The second and the fourth piece of information are also different from one another. The method determines a plausibility of the first and the third piece of information by comparing the first and the third piece of information and determines a plausibility of the second and the fourth piece of information by comparing
(Continued)

the second and the fourth piece of information and processes at least one of the first to fourth pieces of information.

14 Claims, 6 Drawing Sheets

(51) Int. Cl.
*H04L 69/14* (2022.01)
*H04W 4/40* (2018.01)

(58) Field of Classification Search
CPC ...... H04W 4/46; B60W 30/09; B60W 40/107; B60W 30/00
See application file for complete search history.

(56) References Cited

U.S. PATENT DOCUMENTS

| | | | | |
|---|---|---|---|---|
| 2017/0129487 | A1* | 5/2017 | Wulf | B60W 30/09 |
| 2019/0068639 | A1* | 2/2019 | Alexander | H04W 4/46 |
| 2020/0062250 | A1 | 2/2020 | Boulton | |
| 2020/0068405 | A1* | 2/2020 | Stählin | H04W 4/40 |
| 2020/0386881 | A1* | 12/2020 | Buddendick | G01S 13/589 |
| 2022/0091219 | A1* | 3/2022 | Monteuuis | H04B 17/318 |
| 2023/0202434 | A1* | 6/2023 | Gomes Filho | G08G 1/166 |
| | | | | 701/70 |

FOREIGN PATENT DOCUMENTS

| | | |
|---|---|---|
| DE | 102007058192 A1 | 6/2009 |
| DE | 102014208455 A1 | 11/2015 |
| DE | 102015219933 A1 | 11/2016 |
| EP | 3448072 A1 | 2/2019 |

OTHER PUBLICATIONS

International Search Report and Written Opinion; International Patent Application No. PCT/EP2021/077766; Feb. 7, 2022.
International Preliminary Report on Patentability; International Patent Application No. PCT/EP2021/077766; May 8, 2023.
Office Action; Chinese Application No. 202180089757.0; Jul. 18, 2025.

* cited by examiner

VEHICLE, COMPUTER PROGRAM, APPARATUS AND METHOD FOR A VEHICLE

PRIORITY CLAIM

This patent application is a U.S. National Phase of International Patent Application No. PCT/EP2021/077766, filed 7 Oct. 2021, which claims priority to German Patent Application No. 10 2020 214 058.8, filed 9 Nov. 2020, the disclosures of which are incorporated herein by reference in their entireties.

SUMMARY

Illustrative embodiments relate to a transportation vehicle, a computer program, an apparatus, and a method for a transportation vehicle. Illustrative embodiments relate, in particular, but not exclusively, to a concept for processing information communicated among transportation vehicles.

BRIEF DESCRIPTION OF THE DRAWINGS

Disclosed embodiments are described in greater detail below with reference to the drawings, in which.

DETAILED DESCRIPTION

Figure 1:
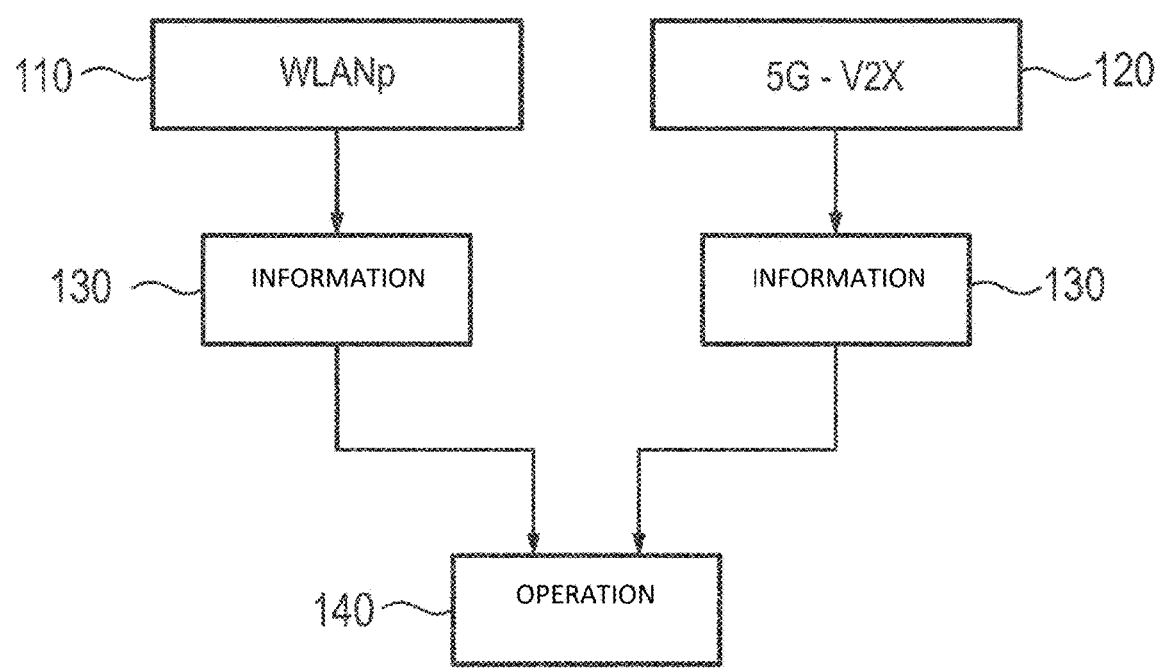
FIG. 1 shows a block diagram for schematically illustrating a known concept for communication and processing of information.

In the field of (partially) autonomous/automated driving, the communication of information among transportation vehicles and the use of such information for autonomous/automated driving is becoming more and more important. Such information may be used, for example, by a driving assistance system for automated or partially automated control of a transportation vehicle. To prevent influences of erroneous and manipulated information, for example, it may be desirable to check the information for the plausibility thereof.

Document DE 10 2014 208 455 A1 describes a concept for controlling a transportation vehicle driven on a road by a driver with at least one safety component provided on the transportation vehicle for use in a predetermined dangerous situation. The concept provides for acquiring information describing the predetermined dangerous situation via an ad hoc network and controlling the safety component on the basis of the captured information. Furthermore, this concept provides for plausibilization of the information by a vehicle's own sensor system. Implementing this concept therefore requires a corresponding sensor system. The plausibilization can go wrong if the vehicle's own sensor system is not able to provide information required for the plausibilization.

Document DE 10 2007 058 192 A1 describes a concept for checking non-redundant sensor information items. In particular, this concept provides for checking non-redundant sensor information items of one environment sensor by sensor information items of another environment sensor, which were optionally acquired on another signal path and/or in another description form. The sensor information items are acquired, for example, via different signal paths between transportation vehicles. In this way, it is possible to ascertain undesired interventions in one of the signal paths, for example, but not undesired manipulations of a source of the sensor information items.

There is therefore a need for an improved concept for communication and processing of information.

This need is met by the subjects of the independent and dependent claims.

Exemplary embodiments provide a method for a transportation vehicle. The method comprises receiving a first information item and a second information item about surroundings of the transportation vehicle via a first communication connection, and also a third information item and a fourth information item about the surroundings of the transportation vehicle via a second communication connection. The first information item and the third information item are different from one another. Furthermore, the second information item and the fourth information item are different from one another. Moreover, the proposed method comprises determining a plausibility of the first information item and of the third information item by comparing the first information item with the third information item, and determining a plausibility of the second information item and of the fourth information item by comparing the second information item and the fourth information item. Furthermore, the method comprises processing at least one of the first to fourth information items in accordance with the determined plausibility of the first to fourth information items.

The transportation vehicle is, for example, a (partially) automated/automatic transportation vehicle.

In the context of the disclosed embodiments, the plausibility can be understood to mean a criterion of the first to fourth information items which indicates how realistic the first to fourth information items are, for example, with what probability or credibility the first to fourth information items correspond to reality.

The first to fourth information items comprise, for example, different and mutually redundant information items about the surroundings. In particular, the first to fourth information items can be generated by different information sources, such as various sensors, for example, and/or can be provided by various information or data storage devices. The first to fourth information items are received, for example, from another transportation vehicle or a vehicle-external server.

The process, according to the method, of comparing the first information item with the third information item and the second information item with the fourth information item makes it possible, for example, to ascertain an integrity of the communication connections and of the first to fourth information items on the basis of deviations between the information items compared with one another. For example, for the first to fourth information items it is possible to ascertain whether the respective information item is trustworthy/plausible and the communication connection via which the respective information item was received has been manipulated.

It is self-evident to a person skilled in the art that the method can analogously be applied to more than four information items.

In some exemplary embodiments, the first communication connection and the second communication connection are two mutually different communication connections via mutually different wireless networks. For example, the first communication connection can be a communication connection via a local wireless network and/or the second communication connection can be a communication connection via a cellular network.

In some exemplary embodiments, the method comprises receiving the first to fourth information items from the same node of a traffic communication network. Receiving the first to fourth information items from the same node of the traffic communication network makes it possible to check a trustworthiness of this node.

The node is, for example, another transportation vehicle or a traffic infrastructure object.

In some exemplary embodiments, processing at least one of the first to fourth information items comprises processing at least one of the first to fourth information items by a driving assistance system in accordance with the determined plausibility of the first to fourth information items. Plausible information items of the first to fourth information items are processed, for example, by safety-critical driving assistance systems (for example, a braking assistance system). By contrast, implausible information items of the first to fourth information items are not processed by such safety-critical driving assistance systems, for example. This makes it possible to prevent the introduction of possibly incorrect or manipulated data into the driving assistance system, and thus to increase driving safety.

In some exemplary embodiments, the first to fourth information items each comprise a time stamp with information about a corresponding point in time at which they were generated. Moreover, determining the plausibility of the first to fourth information items can comprise determining the plausibility using the time stamps. Manipulations and interventions in the communication of transportation vehicles can result in the communication being delayed. Therefore, on the basis of the time stamps, it is additionally possible to ascertain whether manipulations or interventions have taken place.

Exemplary embodiments furthermore provide a further method for a transportation vehicle. The method comprises receiving at least one information item from another transportation vehicle. Moreover, the method comprises receiving trustworthiness information indicating a trustworthiness of the other transportation vehicle. Furthermore, the method comprises processing the at least one information item by the transportation vehicle in accordance with the trustworthiness of the other transportation vehicle indicated by the trustworthiness information. The method makes it possible, for example, to prevent the processing of incorrect or manipulated information for safety-critical interventions in control of the transportation vehicle.

The transportation vehicle is, for example, a (partially) automated/automatic transportation vehicle.

In some exemplary embodiments, processing the at least one information item comprises assigning a safety level to the information depending on the trustworthiness of the other transportation vehicle indicated by the trustworthiness information. Moreover, processing the at least one information item comprises processing the information exclusively by a driving assistance system of the transportation vehicle, which is assigned to the safety level assigned to the information. This enables information items to be processed in a way differentiated in accordance with their trustworthiness.

In some exemplary embodiments, the method comprises receiving a plurality of information items from the other transportation vehicle. Moreover, the method can comprise requesting the trustworthiness information from a server to provide the trustworthiness information after the information items from the other transportation vehicle have been received. Furthermore, the method can comprise storing the information items received from the other transportation vehicle at least until the trustworthiness information has been received. Storing the information provides, for example, for temporarily storing or buffering the information until the trustworthiness information has been received. By virtue of the fact that the trustworthiness information is generated and provided by a server, it is possible to save computational capacities for this at the transportation vehicle. Storing the information items received from the other transportation vehicle allows the information items to be kept available in the event of delays between receiving the information items and the trustworthiness information at the transportation vehicle for the processing of the at least one information item in accordance with the trustworthiness indicated by the trustworthiness information. In other words, the storing allows the processing of the at least one information item, even in the event of delays between receiving the information items and the trustworthiness information items.

In some exemplary embodiments, receiving the at least one information item comprises receiving a first information item and a second information item from the other transportation vehicle via a first communication connection, and also a third information item and a fourth information item via a second communication connection. Moreover, the first information item and the third information item, and also the second information item and the fourth information item, can in each case be different from one another. Furthermore, the method can comprise determining a plausibility of the first information item and of the third information item by comparing the first information item with the third information item, and determining a plausibility of the second information item and of the fourth information item by comparing the second information item and the fourth information item. Moreover, processing the at least one information item can comprise processing at least one of the first to fourth information items in accordance with the trustworthiness of the other transportation vehicle indicated by the trustworthiness information and in accordance with the determined plausibility of the first to fourth information items. In this way, the information items are processed on the basis of a plurality of indicators (the plausibility and the trustworthiness information) for the trustworthiness. It is thereby possible to afford higher safety when using the first to fourth information items.

In some exemplary embodiments, the method furthermore comprises storing the other transportation vehicle as trustworthy or unreliable in a local database of the transportation vehicle depending on the trustworthiness of the other transportation vehicle indicated by the trustworthiness information. To determine a trustworthiness or integrity of further information items received from the other transportation vehicle, for example, the local database allows the information items to be assigned to the corresponding other transportation vehicle stored in the local database. Receiving further trustworthiness information containing the stored other transportation vehicle becomes obsolete as a result. Resources for communication with the server are thus saved, for example.

Exemplary embodiments also provide a method for a server. The method comprises receiving at least one information item from a transportation vehicle. Moreover, the method comprises determining a trustworthiness of the transportation vehicle on the basis of a plausibilization of the at least one information item received from the transportation vehicle. Furthermore, the method comprises storing the transportation vehicle in a database of trustworthy transportation vehicles if the transportation vehicle was determined as trustworthy. The method allows the server to inform other transportation vehicles about the trustworthiness using the database, for example. This makes it possible, for example, to avoid a situation in which incorrect or manipulated information items received from transportation vehicles which are apparently real to the other transportation vehicles but in reality are only simulated influence safety-critical functions and/or driver assistance systems/driving assistance systems of the other transportation vehicles.

In some exemplary embodiments, the method comprises receiving a request from a further transportation vehicle about the trustworthiness of the transportation vehicle. Moreover, the method can comprise communicating trustworthiness information identifying the transportation vehicle as trustworthy to the further transportation vehicle if the transportation vehicle is stored in the database of trustworthy transportation vehicles. This allows the further transportation vehicle to assess the integrity or trustworthiness of information items received by the further transportation vehicle and to process the information items according to their trustworthiness or integrity.

Exemplary embodiments also provide a computer program comprising a program code for carrying out one of the methods proposed herein when the computer program is executed on a computer, a processor, a data processing circuit, a control module or a programmable hardware component.

Exemplary embodiments also provide an apparatus for a transportation vehicle. The apparatus comprises one or more interfaces for communication and a data processing circuit. The one or more interfaces and the data processing circuit are configured for carrying out one of the methods proposed herein for a transportation vehicle.

Exemplary embodiments also provide a transportation vehicle comprising the apparatus proposed herein.

Exemplary embodiments also provide a server comprising one or more interfaces for communication and a data processing circuit, which are configured for carrying out one of the methods proposed herein for a server.

Various exemplary embodiments will now be described more thoroughly with reference to the accompanying drawings, which illustrate some exemplary embodiments. Optional features or components are illustrated here using dashed lines.

Although exemplary embodiments may be modified and amended in various ways, exemplary embodiments are illustrated as examples in the figures and are described thoroughly herein. It should be clarified, however, that there is no intention to restrict exemplary embodiments to the states respectively disclosed, rather that exemplary embodiments are intended to cover all functional and/or structural modifications, equivalents and alternatives that lie within the scope of the disclosure.

It should be noted that one element designated as "connected" or "coupled" to another element may be directly connected or coupled to the other element, or intervening elements may be present. By contrast, if one element is designated as "directly connected" or "directly coupled" to another element, no intervening elements are present. Other terms used to describe the relationship between elements should be interpreted in a similar way (e.g., "between" vis-à-vis "directly therebetween", "adjacent" vis-à-vis "directly adjacent", etc.).

The terminology used herein serves merely to describe specific exemplary embodiments and is not intended to restrict the exemplary embodiments. As used herein, the singular forms "a", "an" and "the" are also intended to include the plural forms, as long as the context does not unambiguously indicate something else. Furthermore, it should be clarified that the expressions such as, e.g., "includes", "including", "has", "comprises", "comprising" and/or "having", as used herein, indicate the presence of stated features, integers, work sequences, elements and/or components, but do not exclude the presence or the addition of one or one or more features, integers, work sequences, elements, components and/or groups thereof.

FIG. 1 shows a block diagram for illustrating a conventional concept for communication and processing of information. This concept provides for receiving information 130 from a transmitter via different interfaces 110 and 120, comparing the information for the purpose of plausibilization and, in a further operation at 140, processing the information according to the plausibility thereof.

For example, as shown in FIG. 1, the information 130 received from the interfaces 110 and 120 may indicate in agreement that a transportation vehicle ahead has applied the "automatic emergency brake". The information 130 can therefore be classified as plausible and can be used for use for safety-critical functions of the transportation vehicle, such as for an automatic evading or braking maneuver, for example. Otherwise, if the information items received from each of the interfaces 110 and 120 deviate from one another, they can be classified as implausible and use of the information items can be dispensed with.

The concept shown in FIG. 1 is unsuitable, however, for establishing whether an information source of the information 130 is trustworthy. If the information source of the information 130 has been manipulated or hacked, for example, the plausibilization may show that the information 130 is valid/plausible even though the information has been manipulated and/or simulated.

Therefore, there is a need for an improved concept for communication and processing of information items.

This need can be met by the exemplary embodiments described below.

Figure 2:
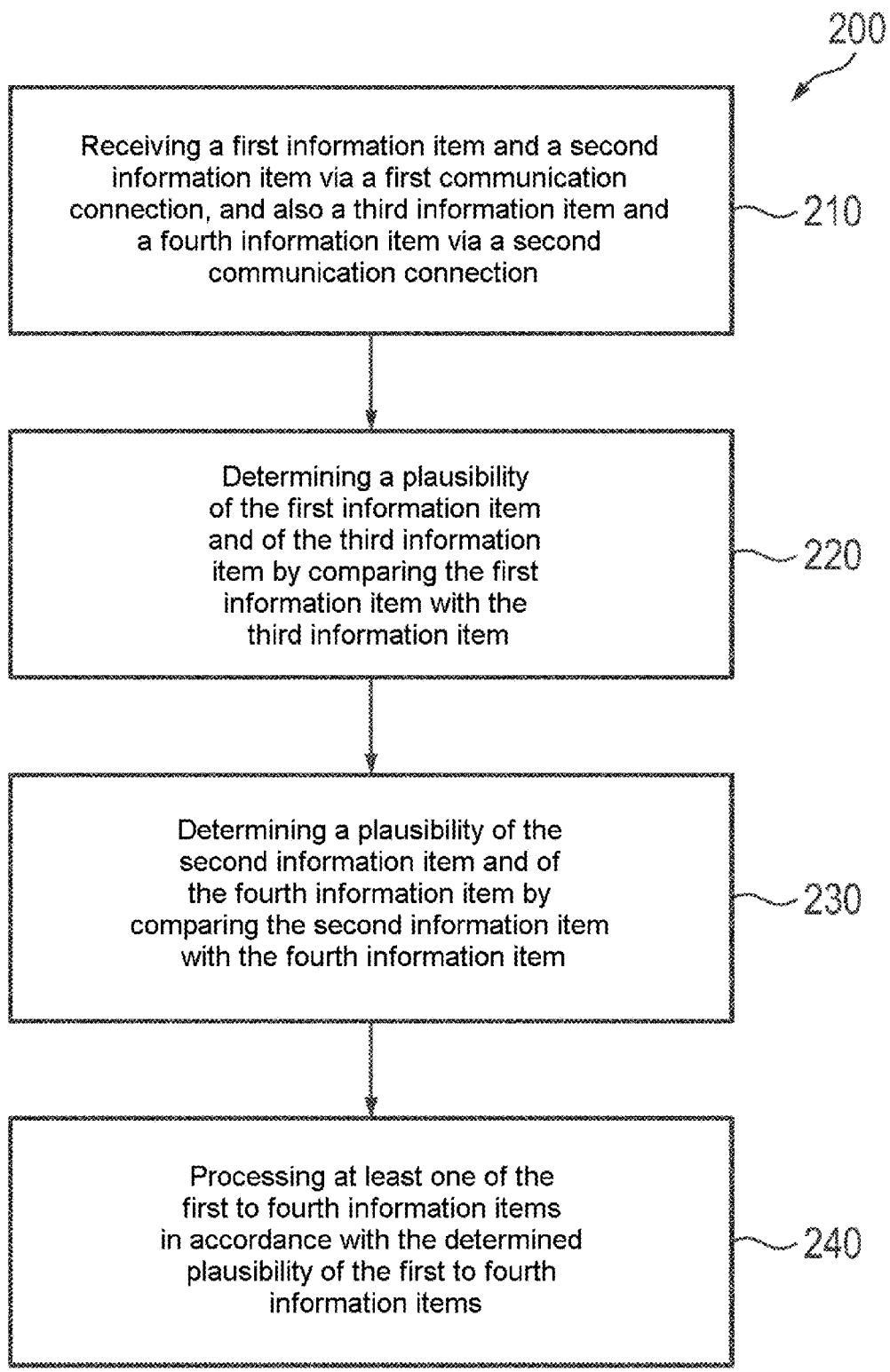
FIG. 2 shows a flow diagram of an exemplary embodiment of a disclosed method for a transportation vehicle.

FIG. 2 shows a flow diagram of one exemplary embodiment of a method 200 for a transportation vehicle. The method 200 comprises receiving 210 a first information item and a second information item about surroundings of the transportation vehicle via a first communication connection, and also a third information item and a fourth information item about the surroundings of the transportation vehicle via a second communication connection. The first to fourth information items can optionally be received from the same node or from separate nodes of a traffic communication network, for example, from another transportation vehicle and/or a traffic infrastructure object (e.g., servers or traffic light systems configured for communication with transportation vehicles). The first communication connection and the second communication connection can each be understood as a path via which the first and second information items, and respectively the second and fourth information items, are received by the transportation vehicle. According to the method, the first and second information items are received by the transportation vehicle, for example, via a different network and/or a different interface than the third and fourth information items. The first communication connection is, for example, a communication connection via a local wireless network and/or the second communication connection is, for example, a communication connection via a cellular network. It is self-evident to a person skilled in the art that the first and second communication connections can optionally comprise communication connections/paths via various other networks.

The first to fourth information items each comprise, for example, a message to the transportation vehicle and/or information about a position, extent and/or movement of one or more objects (e.g., road users or obstacles) in the surroundings. In particular, the first to fourth information items can comprise measurement data from sensors in the surroundings of the transportation vehicle.

The first information item and the third information item, and also the second information item and the fourth information item, are in each case different from one another. The first information item and the third information item, and also the second information item and the fourth information item, can differ in so far as the first information item and the third information item, and respectively the second information item and the fourth information item, have been generated by different sensors (e.g., by different sensors of the other transportation vehicle and/or of the infrastructure object) and/or have been stored and/or processed by separate processor circuits (e.g., different control units of the other transportation vehicle).

Furthermore, the method 200 comprises determining 220 a plausibility of the first information item and of the third information item by comparing the first information item with the third information item, and determining 230 a plausibility of the second information item and of the fourth information item by comparing the second information item and the fourth information item. The comparing makes it possible to check the first information item and the third information item, and respectively the second information item and the fourth information item, for similarity. Depending on the similarity, the information items compared with one another (the first and third information items, and respectively the second and fourth information items) can be classified as "plausible" or "implausible". The plausibility can optionally also be indicated in some other way.

Moreover, the method comprises processing 240 at least one of the first to fourth information items in accordance with the determined plausibility of the first to fourth information items. The processing 240 provides, for example, for the further processing of one or more of the first to fourth information items depending on the plausibility of the first information item and of the third information item and also the plausibility of the second information item and of the fourth information item. Depending on disturbance, one or more of the first to fourth information items may turn out to implausible. Depending on the respective plausibility, the first, second, third and/or fourth information item can be discarded or used for specific functions of the transportation vehicle. If the first to fourth information items are implausible, they are discarded, for example. Otherwise, if the first to fourth information items are plausible, they are permitted to be processed by safety-critical driver assistance systems/driving assistance systems, for example.

Optionally, the first to fourth information items can be assigned a respective weighting in accordance with their plausibility.

The method 200 thus allows implausible information items stemming from manipulations of their information sources, for example, to be recognized and the (undesired) effect thereof on, e.g., safety-critical functions of the transportation vehicle to be prevented or at least reduced. In particular, the method 200 also allows an integrity of the communication connections to be checked. A person skilled in the art will additionally recognize that the method 200 allows, depending on the plausibility of the first and third information items and the plausibility of the second and fourth information items, determination of whether a disturbance of a communication connection and/or a disturbance of an information source of the first to fourth information items are/is present.

The method 200 can be performed by the above-mentioned transportation vehicle, for example.

Figure 3:
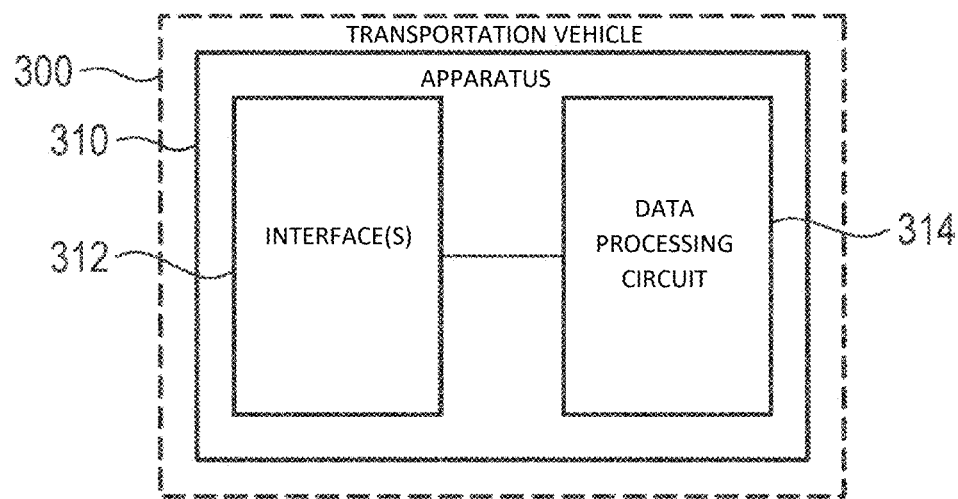
FIG. 3 shows a block diagram of an exemplary embodiment of a disclosed apparatus for performing the method for a transportation vehicle.

FIG. 3 shows a block diagram of one exemplary embodiment of an apparatus 310 for performing the proposed method 200. The apparatus 310 can be installed optionally in a transportation vehicle 300, as indicated by dashed lines in FIG. 3. Optionally, the one or more interfaces 312 and the data processing circuit 314 are configured for implementing optional exemplary embodiments of the method 200.

The apparatus 310 comprises one or more interfaces 312 for communication and a data processing circuit 314. The one or more interfaces 312 and the data processing circuit 314 are configured for carrying out the method 200 proposed herein.

In exemplary embodiments, the one or more interfaces 312 of the apparatus 310 can be configured as contacts of the data processing circuit 314. In exemplary embodiments, they can also be embodied as separate hardware. They can comprise storage devices that at least temporarily store the signals to be transmitted and/or the received signals. The one or more interfaces 312 can comprise means suitable for receiving electrical signals, for example, a bus interface, or an optical interface. Furthermore, in exemplary embodiments, they can be configured for radio transmission and comprise a radio frontend and also associated antennas. Furthermore, the at least one or more interfaces 312, for example, for a CAN bus (CAN: Controller Area Network), can comprise synchronization mechanisms for synchronization with the respective transmission medium. In exemplary embodiments, the one or more interfaces 312 can comprise any method or mechanism for communication to receive the first to fourth information items. For this purpose, the one or more interfaces 312 can comprise method or mechanism for communication with other transportation vehicles and/or traffic infrastructure objects. The one or more interfaces 312 comprise, for example, at least one Dedicated Short-Range Communication (DSRC) interface and/or an interface in accordance with a standard of the 3rd Generation Partnership Project (3GPP).

In exemplary embodiments, the data processing circuit 314 can be hardware configured for carrying out one of the methods described herein. This may be arbitrary processor cores, such as digital signal processor cores (DSPs) or other processors. In this case, exemplary embodiments are not restricted to a specific type of processor core. Arbitrary processor cores or else a plurality of processor cores or microcontrollers are conceivable for implementing the data processing circuit 314. Implementations in integrated form with other apparatuses are also conceivable, for example, in a control unit for a transportation vehicle which additionally also comprises one or more other functions. In exemplary embodiments, the data processing circuit 314 can be realized by a processor core, a computer processor core (CPU=Central Processing Unit), a graphics processor core (GPU=Graphics Processing Unit), an application-specific integrated circuit core (ASIC), an integrated circuit (IC), a system-on-chip core (SOC), a programmable logic element or a field programmable gate array (FPGA) with a microprocessor as the core of the abovementioned module or modules. The data processing circuit 314 can accordingly comprise any component or any combination of components (e.g., one or more circuits) which is suitable for determining the plausibility of the first information item and of the third information item, for determining the plausibility of the second information item and of the fourth information item, and for processing at least one of the first to fourth information items in accordance with the determined plausibility of the first to fourth information items. Optionally, the one or more interfaces 312 and the data processing circuit 314 can furthermore be configured for implementing optional features of the method 200 proposed herein.

Figure 4:
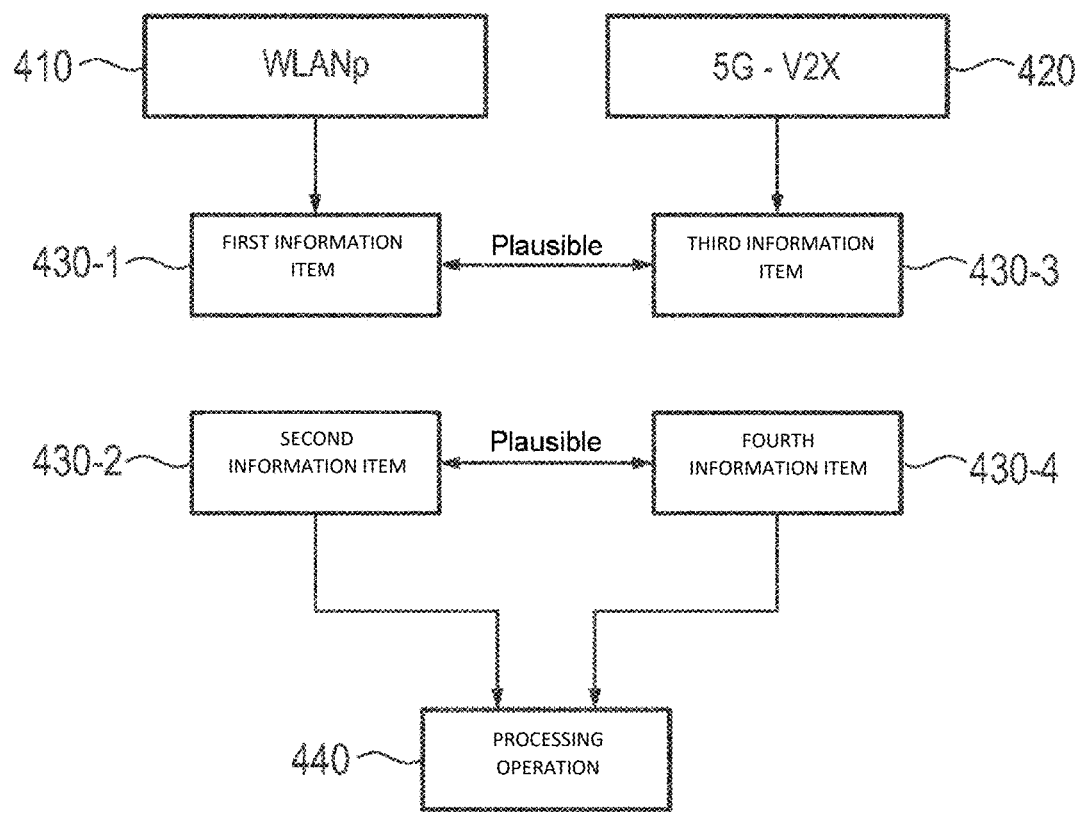
FIG. 4 shows a block diagram for schematically illustrating an application of the disclosed method for a transportation vehicle.

Various further optional features of the method 200 will now be explained in greater detail with reference to an application of the method 200 as shown in FIG. 4. As shown in FIG. 4, a transportation vehicle, for performing the method 200, can be equipped with a first interface 410 and a second interface 420 for communication with a traffic infrastructure object and/or one or more other transportation vehicles. The first interface 410 is embodied as a so-called "WLANp" interface to a local wireless network in accordance with the IEEE 802.11p standard. The second interface is embodied as a so-called "5G-V2X" interface to a cellular network in accordance with the C-V2X standard. It is self-evident to a person skilled in the art that other interfaces can alternatively be used.

A message comprising a first information item 430-1 and a second information item 430-2 is received via the interface 410. A further message comprising a third information item 430-3 and a fourth information item 430-4 is received via the interface 420. Optionally, the information items 430-1, 430-2, 430-3 and 430-4 can be received separately, for example, in separate messages.

As will be understood by a person skilled in the art, the message comprising the first and second information items 430-1 and 430-2 and the further message comprising the third and fourth information items 430-3 and 430-4 can be the same/identical to reduce a technical complexity on the part of a transmitter of the messages.

As can be seen in FIG. 4, furthermore, the first information item 430-1 and the fourth information item 430-4, and also the second information item 430-2 and the third information item 430-3, can correspond to one another, and the first information item 430-1 and the second information item 430-2, and also the third information item 430-3 and the fourth information item 430-4, can be different relative to one another. The first and fourth information items 430-1 and 430-4, for example, and also the second and third information items 430-2 and 430-3, can be identical information items (identical measured values and/or identical information items about a position, an extent and/or a movement of one or more objects in the surroundings). On the other hand, the first and third information items 430-1 and 430-3, and also the second information item 430-2 and the fourth information item 430-4, can be different and originate, for example, from different information sources, such as different sensors and/or different control units of the other transportation vehicle, for example.

The first and fourth information items 430-1 and 430-4 originate, for example, from a first information source such as a first sensor and/or a first control unit (of the other transportation vehicle), for example. In the example in FIG. 4, the first and fourth information items 430-1 and 430-4 indicate that an automatic emergency brake of a transportation vehicle ahead is actuated. The second and third information items 430-2 and 430-3 originate, for example, from a second information source, for example, a second sensor and/or a second control unit (of the other transportation vehicle). In the example in FIG. 4, the second and third information items 430-2 and 430-3 indicate that a deceleration of the transportation vehicle ahead is greater than a threshold value X.

By comparing the first information item 430-1 with the third information item 430-3 and comparing the second information item 430-2 with the fourth information item 430-4, it is possible to check the information items compared with one another for similarity. The plausibility of the first and third information items 430-1 and 430-3 and also the plausibility of the second and fourth information items 430-2 and 430-4 can be determined on the basis of the similarity.

In the present case, the similarity of the first and fourth information items 430-1 and 430-2 results from the fact that the deceleration of the transportation vehicle ahead upon actuation of the automatic emergency brake is implicitly greater than the threshold value X. A person skilled in the art will understand that the threshold value X can be chosen accordingly so that decelerations above the threshold value X indicate the activation of the automatic emergency brake.

As will be understood by a person skilled in the art, the information items 430-1 to 430-4 can, for example, each indicate information items concerning a position, an extent, a state and/or a movement (e.g., a speed, direction of movement, acceleration) of an object (e.g., of a transportation vehicle) in the surroundings and a plausibilization can be effected on the basis of a similarity of the information items concerning the position, the extent, the state and/or the movement.

Comparing the first information items 430-1 with the third information item 430-3 and comparing the second information item 430-2 with the fourth information item 430-4 for the purpose of plausibilization (also known as "cross-comparison") allows, compared with the concept shown in FIG. 1, in particular, not only a recognition of disturbances/defects and/or interventions in one of the communication connections but also a recognition of disturbances/defects of the information sources and/or interventions in the information sources for manipulation of the information items 430-1 to 430-4.

Depending on a plausibility, at least one of the information items 430-1 to 430-4 can be processed dependent on the plausibility in a processing operation at 440. The at least one information item can be processed, for example, depending on the plausibility for different functions of the transportation vehicle and/or by different systems (e.g., driver assistance systems/driving assistance systems). If one or more of the first to fourth information items 430-1 to 430-4 are classified as plausible, one or more of the information items classified as plausible can be processed, for example, for actuating safety-critical functions and/or driver assistance systems/driving assistance systems. If one or more of the first to fourth information items 430-1 to 430-4 are classified as implausible, one or more of the information items classified as implausible can be, for example, discarded, deleted and/or processed only for actuating functions that are not relevant to the safety of the transportation vehicle and/or for actuating driver assistance systems/driving assistance systems. If the plausibilization reveals, for example, that the information items 430-1 to 430-4 are plausible, the automatic emergency brake of the transportation vehicle can be actuated on the basis of the information items 430-1 to 430-4. Otherwise, if the plausibilization reveals, for example, that information items are implausible, processing of the information items for functions of the transportation vehicle (e.g., processing by an assistance system for applying the automatic emergency brake) can be dispensed with or use can be made thereof only for a non-safety-critical function.

Optionally, the first to fourth information items can each comprise a time stamp with information about a corresponding point in time at which they were generated. Consequently, the plausibility can furthermore be determined using the time stamps.

The time stamps can be taken as a basis, for example, for checking whether delays indicating manipulation of the information items 430-1 to 430-4 occurred in the generation and/or transmission of the first to fourth information items 430-1 to 430-4. With the time stamps being taken into account, the plausibilization can thus be improved.

Figure 5:
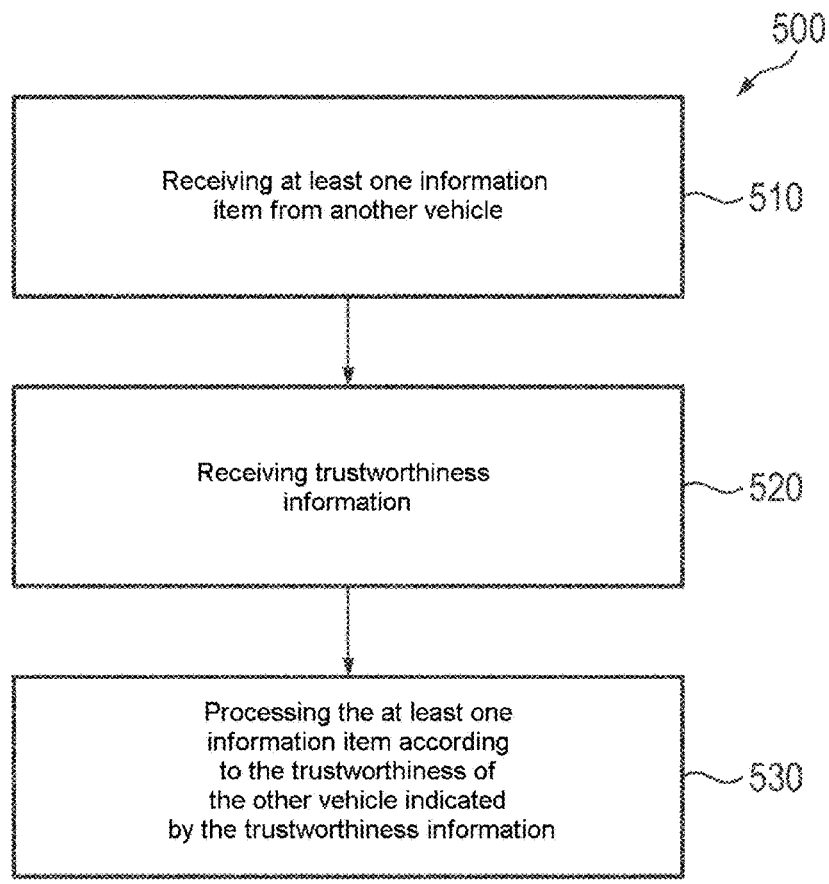
FIG. 5 shows a flow diagram of an exemplary embodiment of a disclosed method for a transportation vehicle.

Optionally, the plausibilization of the information items can be improved further by application of a method shown in FIG. 5.

FIG. 5 shows a further method 500 for a transportation vehicle. The method 500 comprises receiving 510 at least one information item from another transportation vehicle. The information can be received from the other transportation vehicle, for example, wirelessly via a local wireless network and/or a cellular network. The information comprises, for example, measurement data and/or information about a position, extent and/or movement of one or more objects within the surroundings of the transportation vehicle. As explained in greater detail later, the method 500 can optionally comprise receiving a plurality of information items.

Furthermore, the method 500 comprises receiving 520 trustworthiness information indicating a trustworthiness of the other transportation vehicle. The trustworthiness information should be understood, for example, as a measure of an assessment of whether and to what extent (e.g., with what probability) the transportation vehicle is trustworthy or unreliable and simulated, for example. The trustworthiness information can be received from a server (acting as backend), for example, wirelessly via a local wireless network and/or a cellular network. Alternatively, the trustworthiness information can be received from a further transportation vehicle or a traffic infrastructure object. The trustworthiness information indicates, for example, whether the other transportation vehicle is trustworthy or unreliable (e.g., a simulated road user). As will be understood by a person skilled in the art, the trustworthiness in the case of the trustworthiness information can optionally be indicated in some other way, for example, by a message, as a value or as a Boolean.

Moreover, the method 500 comprises processing 530 via at least one information item by the transportation vehicle in accordance with the trustworthiness of the other transportation vehicle indicated by the trustworthiness information. Depending on the trustworthiness, the information can be, for example, weighted differently, discarded or used for different specific functions and/or systems (e.g., driver assistance systems/driving assistance systems) of the transportation vehicle.

The method 500 allows manipulations and incorrect information items to be recognized and the information items to be processed in such a way that an influence of incorrect information items on the transportation vehicle or functions of the transportation vehicle can at least be reduced. Moreover, the method 500 allows checking of the other transportation vehicle for the trustworthiness thereof outside the transportation vehicle, for example, on a vehicle-external server or backend, to save the computing power necessary for the checking in the transportation vehicle.

Processing 530 the at least one information item optionally comprises assigning a safety level to the information depending on the trustworthiness of the other transportation vehicle indicated by the trustworthiness information. The at least one information item is assigned a safety level according to the Automotive Safety Integrity Level (ASIL) standard depending on the trustworthiness or trustworthiness information, for example. Possible safety levels according to this standard, enumerated here in ascending order with regard to their integrity level, are, for example, "Quality Management" (QM), ASIL-A, ASIL-B, ASIL-C and ASIL-D.

Accordingly, processing the at least one information item can comprise processing the information exclusively by a driving assistance system of the transportation vehicle which is assigned to the safety level assigned to the information. If the safety level "QM" is assigned to the information, for example, the latter is used only for use for functions of the transportation vehicle to which the safety level "QM" is also assigned. The information, if the safety level "QM" is assigned to it, is used, for example, for controlling a non-safety-critical function, such as control of a transportation vehicle's own entertainment electronics, for example. If the safety level "ASIL-D" is assigned to the information, for example, the at least one information item can be processed, for example, for use for functions of the transportation vehicle which are also assigned to ASIL-D or to a lower safety level. The at least one information item, if the safety level ASIL-D is assigned to it, is used, for example, for controlling/actuating the automatic emergency brake.

As will be understood by a person skilled in the art, the safety levels can also be determined in a different way, for example, in regard to a different standard for safety levels.

Optionally, the method 500 comprises receiving a plurality of information items from the other transportation vehicle. The information items are received in temporal succession, for example. In particular, the information items can be received from the transportation vehicle at a predefined time interval.

Furthermore, the method 500 can comprise requesting the trustworthiness information from a server to provide the trustworthiness information after receiving the information items from the other transportation vehicle. The server can be a vehicle-external server or a backend which can be operated by a trustworthy entity for the benefit of trustworthiness of the trustworthiness information. For requesting the trustworthiness, the transportation vehicle transmits a message with a request to the server, for example. The request, or the message, can be transmitted wirelessly via a wireless local network, a cellular network or the like.

In addition, the method can comprise storing the information items received from the other transportation vehicle at least until the trustworthiness information has been received. As explained in greater detail later, the information items are saved, for example, on a buffer storage device for storage purposes.

For an improved plausibilization, the method 500 can furthermore comprise the method 200. In particular, receiving 510 the at least one information item can comprise receiving a first information item and a second information item from the other transportation vehicle via a first communication connection, and also a third information item and a fourth information item via a second communication connection. The first information item and the third information item, and also the second information item and the fourth information item, can in each case be different from one another. Furthermore, the method 500 can comprise determining a plausibility of the first information item and of the third information item by comparing the first information item with the third information item, and determining a plausibility of the second information item and of the fourth information item by comparing the second information item and the fourth information item. Processing 530 the at least one information item can optionally comprise processing at least one of the first to fourth information items in accordance with the trustworthiness of the other transportation vehicle indicated by the trustworthiness information and in accordance with the determined plausibility of the first to fourth information items. This allows multiple and hence improved determination of the trustworthiness.

Optionally, the method 500 comprises storing the other transportation vehicle as trustworthy or unreliable in a local database of the transportation vehicle depending on the trustworthiness of the other transportation vehicle indicated by the trustworthiness information. To store the other transportation vehicle as trustworthy or unreliable, a reference of the other transportation vehicle, for example, an identification sign of the other transportation vehicle, can be stored in the local database. In particular, the identification sign can be stored together with the trustworthiness information or at least a reference to the trustworthiness information. An assignment of the trustworthiness information to messages received later from the other transportation vehicle is possible as a result.

As will be understood by a person skilled in the art, the method 500 can optionally be applied for a plurality of other transportation vehicles.

Figure 6:
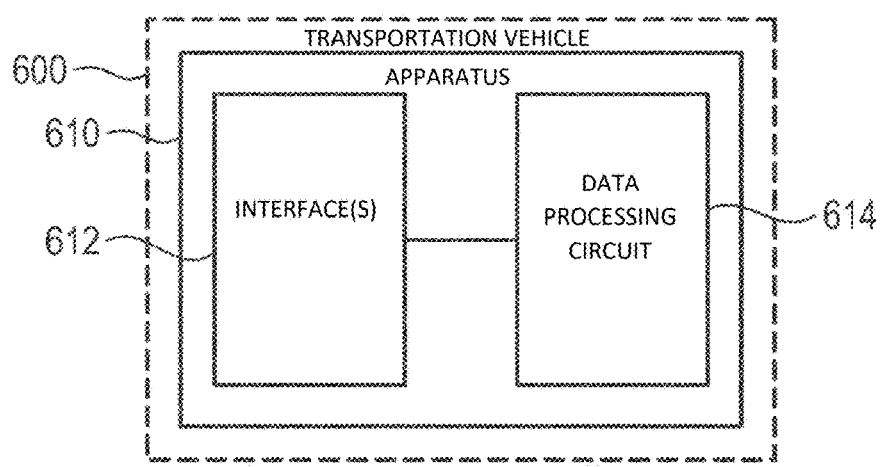
FIG. 6 shows a block diagram of an exemplary embodiment of a disclosed apparatus for a transportation vehicle.

FIG. 6 shows a block diagram of one exemplary embodiment of an apparatus 610 for a transportation vehicle. The apparatus 610 can be optionally installed on a transportation vehicle 600, as indicated by dashed lines in FIG. 6.

The apparatus 610 comprises one or more interfaces 612 for communication and a data processing circuit 614. The one or more interfaces 612 and the data processing circuit 614 are configured for carrying out the method 500 proposed herein. Optionally, the one or more interfaces 612 and the data processing circuit 614 are configured for implementing optional exemplary embodiments of the method 500.

In exemplary embodiments, the one or more interfaces 612 of the apparatus 610 can be configured as contacts of the data processing circuit 614. In exemplary embodiments, they can also be embodied as separate hardware. They can comprise storage devices that at least temporarily store the signals to be transmitted and/or the received signals. The one or more interfaces 612 can comprise methods or mechanisms suitable for receiving electrical signals, for example, a bus interface, or an optical interface. Furthermore, in exemplary embodiments, they can be configured for radio transmission and comprise a radio frontend and also associated antennas. Furthermore, the at least one or more interfaces 612, for example, for the CAN bus, can comprise synchronization mechanisms for synchronization with the respective transmission medium. In exemplary embodiments, the one or more interfaces 612 can comprise any method or mechanism for communication to receive the at least one information item from the other transportation vehicle and the trustworthiness information via the one or more interfaces 612. For this purpose, the one or more interfaces 612 can comprise method or mechanism for communication with other transportation vehicles and/or traffic infrastructure objects. The one or more interfaces 612 comprise, for example, at least one DSRC interface and/or at least one interface in accordance with a 3GPP standard.

In exemplary embodiments, the data processing circuit 614 can be hardware configured for carrying out one of the methods described herein. This may be arbitrary processor cores, such as DSPs or other processors. In this case, exemplary embodiments are not restricted to a specific type of processor core. Arbitrary processor cores or else a plurality of processor cores or microcontrollers are conceivable for implementing the data processing circuit 614. Implementations in integrated form with other apparatuses are also conceivable, for example, in a control unit for a transportation vehicle which additionally also comprises one or more other functions. In exemplary embodiments, the data processing circuit 614 can be realized by a processor core, a CPU, a GPU, an ASIC, an IC, an SOC, a programmable logic element or an FPGA as core of the above-mentioned module or modules. The data processing circuit 614 can accordingly comprise any component or combination of components (e.g., one or more circuits) which is configured for receiving 510 and 520 the at least one information item and the trustworthiness information via the one or more interfaces 612 and for processing 530 the at least one information item in accordance with the trustworthiness indicated by the trustworthiness information.

The method 500 can be performed, for example, together with a method 700 for a server, described below in FIG. 7.

Figure 7:
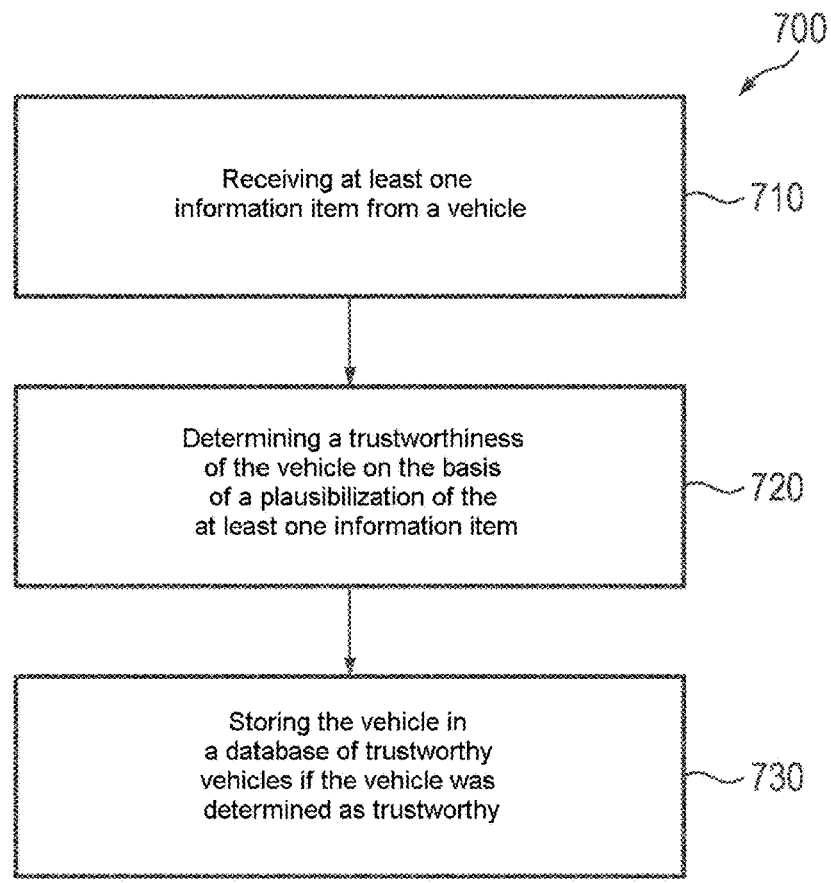
FIG. 7 shows a flow diagram of an exemplary embodiment of a disclosed method for a server.

FIG. 7 shows a flow diagram of one exemplary embodiment of the method 700.

The method 700 comprises receiving 710 at least one information item from a transportation vehicle. For receiving 710 the information item, the server can communicate wirelessly via a wireless local network, a cellular network or the like. The server communicates with the transportation vehicle, for example, by a DSRC interface or an interface in accordance with a 3GPP standard. In combination with the method 500, the transportation vehicle designated in the method 700 corresponds, for example, to the "other transportation vehicle" designated thus in the method 500. The information comprises, for example, measurement data and/or information about a position, extent and/or movement of one or more objects within the surroundings of the transportation vehicle. In particular, the information can correspond to the at least one information item in accordance with method 500.

In addition, the method 700 comprises determining 720 a trustworthiness of the transportation vehicle on the basis of a plausibilization of the at least one information item received from the transportation vehicle. For determining 720 the trustworthiness, the information received from the transportation vehicle can be compared with one or more further information items, such as, for example, information items from further transportation vehicles or another server or information about surroundings of the transportation vehicle. The further information items comprise, for example, a map and/or information items concerning a traffic situation in the surroundings. Optionally, the further information items comprise measurement data and/or messages received by the server from further transportation vehicles or a server. Determining 720 the trustworthiness makes it possible to determine the transportation vehicle as trustworthy or unreliable, for example.

Furthermore, the method 700 comprises a storing 730 of the transportation vehicle in a database of trustworthy transportation vehicles if the transportation vehicle was determined as trustworthy. The database can be stored on the server or outside the server. For storing 730 the transportation vehicle in the database, for example, an identification sign assigned to the transportation vehicle is stored in the database. The identification sign is, for example, an identification sign defined globally for the transportation vehicle. Optionally, the identification sign for the transportation vehicle can vary at predetermined time intervals.

The method 700 optionally comprises receiving a request from a further transportation vehicle about the trustworthiness of the transportation vehicle. In combination with method 500, for example, the transportation vehicle in accordance with method 500 corresponds to the further transportation vehicle in accordance with method 700. The request comprises the identification sign of the transportation vehicle, for example, for the purpose of assigning the request to the transportation vehicle in the database.

In addition, the method 700 can comprise communicating trustworthiness information identifying the transportation vehicle as trustworthy to the further transportation vehicle if the transportation vehicle is stored in the database of trustworthy transportation vehicles. The trustworthiness information corresponds, for example, to the trustworthiness information explained with method 500.

Figure 8:
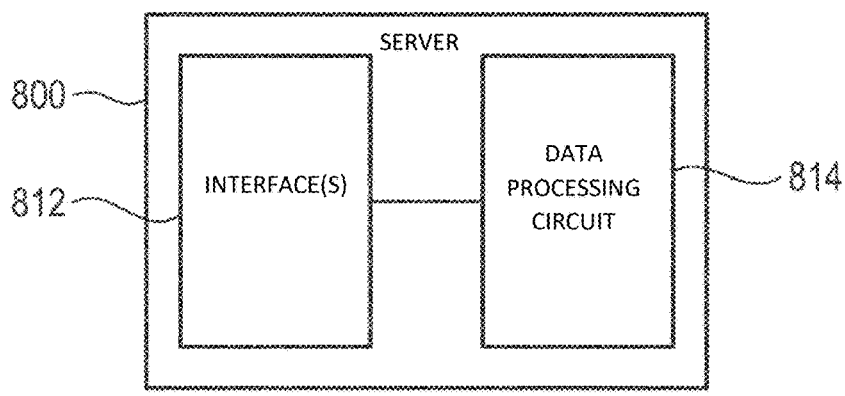
FIG. 8 shows a block diagram of an exemplary embodiment of a server.

The method 700 can be performed by a server, for example. A block diagram of one exemplary embodiment of the server 800 is shown in FIG. 8.

The server comprises one or more interfaces 812 for communication and a data processing circuit 814, which are configured for carrying out the method 700.

In exemplary embodiments, the one or more interfaces 812 of the server 800 can be configured as contacts of the data processing circuit 814. In exemplary embodiments, they can also be embodied as separate hardware. They can comprise storage devices that at least temporarily store the signals to be transmitted and/or the received signals. The one or more interfaces 812 can comprise method or mechanism suitable for receiving electrical signals, for example, a bus interface, or an optical interface. Furthermore, in exemplary embodiments, they can be configured for radio transmission and comprise a radio frontend and also associated antennas. Furthermore, the at least one or more interfaces 812, for example, for the CAN bus, can comprise synchronization mechanisms for synchronization with the respective transmission medium. In exemplary embodiments, the one or more interfaces 812 can comprise any method or mechanism for communication to receive the at least one information item from the transportation vehicle. For this purpose, the one or more interfaces 812 can comprise method or mechanism for communication with transportation vehicles. The one or more interfaces 812 comprise, for example, at least one DSRC interface and/or at least one interface in accordance with a 3GPP standard.

In exemplary embodiments, the data processing circuit 814 can be hardware configured for carrying out one of the methods described herein. This may be arbitrary processor cores, such as DSPs or other processors. In this case, exemplary embodiments are not restricted to a specific type of processor core. Arbitrary processor cores or else a plurality of processor cores or microcontrollers are conceivable for implementing the data processing circuit 814. Implementations in integrated form with other apparatuses are also conceivable, for example, in a control unit for a transportation vehicle which additionally also comprises one or more other functions. In exemplary embodiments, the data processing circuit 814 can be realized by a processor core, a CPU, a GPU, an ASIC, an IC, an SOC, a programmable logic element or an FPGA as core of the above-mentioned module or modules. The data processing circuit 814 can accordingly comprise any component or combination of components (e.g., one or more circuits) which is configured for receiving 710 the at least one information item, determining 720 the trustworthiness of the transportation vehicle and storing 730 the transportation vehicle in a database of trustworthy transportation vehicles.

The methods 200, 500 and 700 proposed herein and also the apparatuses 300, 600 and 800 will be explained in greater detail below with reference to an exemplary application shown in FIG. 9.

Figure 9:
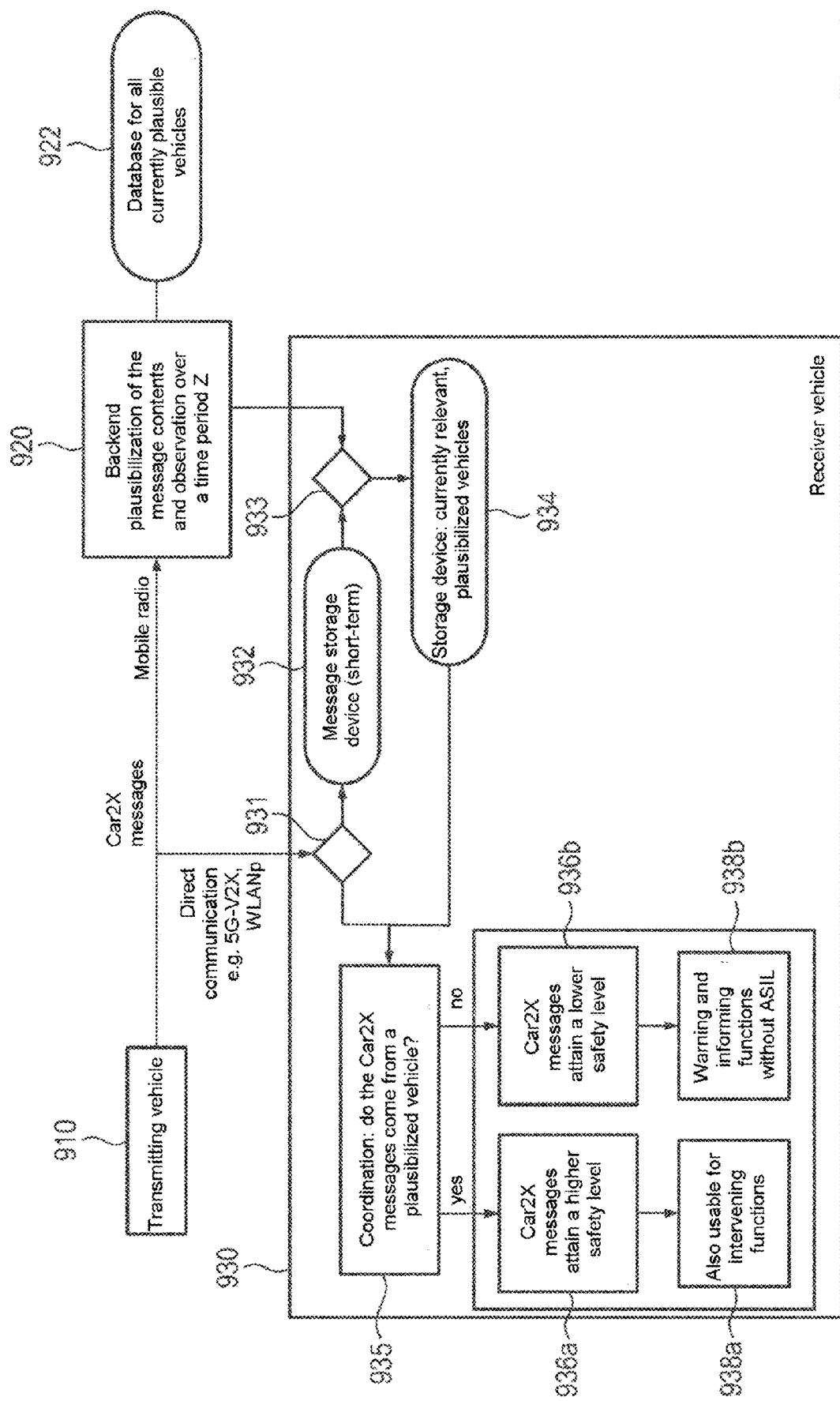
FIG. 9 shows a block diagram for schematically illustrating an exemplary application of the disclosed method, of the disclosed apparatus and of the disclosed server.

FIG. 9 schematically shows a transportation vehicle ("transmitting transportation vehicle") 910, a server ("backend") 920 and a further transportation vehicle ("receiver transportation vehicle") 930. The server 920 is, for example, one exemplary embodiment of the server proposed herein. The transportation vehicle 930 is, for example, one exemplary embodiment of the transportation vehicle proposed herein.

As illustrated in FIG. 9, the transportation vehicle 930 receives an information item from the transportation vehicle 910, for example, via direct communication and using the 5G and/or WLANp standard. The information item can comprise, as illustrated, a message, e.g., a so-called "Car2X" message, such as, for instance, a cooperative awareness message (CAM), a collective perception message (CPM), a decentralized environmental notification message (DENM) or the like, from the transportation vehicle 910 to the transportation vehicle 930.

The same information item, e.g., the same message, can be received from the transportation vehicle 910 by the server 920. On the basis of the information item, the server 920 can determine a trustworthiness of the transportation vehicle 910 on the basis of a plausibilization of the information item in accordance with the method 700. Alternatively or supplementarily, one or more further information items received from the transportation vehicle 910 can be used for determining the trustworthiness. The trustworthiness can optionally be determined using information items which were received from the transportation vehicle 910, for example, within a predetermined time period Z. If the transportation vehicle 910 was determined as trustworthy during the process of determining the trustworthiness, the transportation vehicle 910 can be stored in a database 922 coupled to the server 920. For this purpose, for example, a global identification sign that is predetermined for the transportation vehicle 910 is stored in the database 922. The global identification sign of the transportation vehicle 910 can be received, for example, together with the one or more information items from the transportation vehicle 910.

After the information item has been received by the transportation vehicle 930, in a succeeding operation at 931, the transportation vehicle 930 can temporarily store the information item, or the message, in a storage device 932 of the transportation vehicle 930. In a further operation at 933, the transportation vehicle can request trustworthiness information about trustworthiness of the transportation vehicle 910 from the server 920. For assigning the request, the transportation vehicle 930 can communicate with the request the global identification sign of the transportation vehicle 910, which the transportation vehicle 930 has obtained, for example, with the information item obtained from the transportation vehicle 910. The server 920 can check with the aid of the global identification sign, for example, whether the transportation vehicle 910 is identified as trustworthy in the database 922. If the transportation vehicle 910 is identified as trustworthy in the database 922, the server 920 can communicate to the transportation vehicle 930 trustworthiness information indicating whether and/or to what extent (e.g., with what probability) the transportation vehicle 910 is trustworthy. In operation at 933, the transportation vehicle 930 can thereupon furthermore determine, on the basis of the trustworthiness information indicating the trustworthiness of the transportation vehicle 910, whether the transportation vehicle 910 and thus the information item received from the transportation vehicle 910 is trustworthy/plausible or unreliable/implausible. For the case where the transportation vehicle 910 is classified as trustworthy, the transportation vehicle 930 can store the transportation vehicle 910 as trustworthy in a local database 934 of the transportation vehicle 930.

In a processing operation at 935, as already set out above, the information item can be processed in the transportation vehicle 930 in accordance with the trustworthiness indicated by the trustworthiness information. In the example shown, if the information item is classified as trustworthy/plausible, a higher safety level 936a (e.g., ASIL-C or ASIL-D) is assigned to the information item, and if the information item is not checked for its trustworthiness or is classified as unreliable/implausible, a lower safety level 936b (e.g., QM, ASIL-A or ASIL-B) relative to the higher safety level 936a is assigned to the information item. It should be noted that a different, e.g., finer, assignment of safety level to information items received from the transportation vehicle 910 is optionally possible.

After receiving the trustworthiness information and determining the trustworthiness of the information item by the transportation vehicle 930, it is possible for the information item to be erased from the storage device 932 to free up memory space.

For the case where a lower safety level is assigned to the information item, the latter can be used for functions 938b such as functions for informing and/or warning occupants of the transportation vehicle 930, for example, which are not safety-critical.

For the case where a higher safety level is assigned to the information item, the latter can be used for safety-critical or so-called "intervening" functions and can be processed, for example, by a driver assistance system/driving assistance system (e.g., an automatic braking system). Optionally, the information item can then also be used for functions which require a lower safety level than that assigned to the information item.

It is clear to a person skilled in the art that the concept proposed herein can optionally be applied for the communication and plausibilization of a plurality of different communicated information items and for a plurality of transportation vehicles.

In particular, the transportation vehicle 930, in accordance with method 200, can receive at least four information items from the transportation vehicle 910, determine their plausibility and, in the processing operation at 935, additionally process them further on the basis of the plausibility ascertained as a result. The safety when using the information items for functions of the transportation vehicle can be increased further as a result.

Exemplary embodiments can furthermore be or relate to a computer program comprising a program code for performing one or more of the above methods when the computer program is executed on a computer or processor. Operations or processes of various methods described above can be performed by programmed computers or processors. Examples can also cover program storage devices, e.g., digital data storage media, which are machine-, processor- or computer-readable and code machine-executable, processor-executable or computer-executable programs of instructions. The instructions execute some or all of the operations of the methods described above or cause the execution thereof. The program storage devices can comprise or be, e.g., digital memories, magnetic storage media such as, for example, magnetic disks and magnetic tapes, hard disk drives or optically readable digital data storage media. Further examples can also cover computers, processors or control units which are programmed to perform the operations of the methods described above, or (field) programmable logic arrays ((F)PLAs=(Field) Programmable Logic Arrays) or FPGAs which are programmed to perform the operations of the methods described above.

A block diagram can represent a rough circuit diagram, for example, which implements the principles of the disclosure. In a similar way, a flow diagram, a flow chart, a state transition diagram, a pseudo-code and the like can represent various processes, operations which, for example, are substantially represented in a computer-readable medium and thus executed by a computer or processor, regardless of whether such a computer or processor is explicitly shown. Methods disclosed in the description or in the patent claims can be implemented by a component which has a method or mechanism for performing each of the respective operations of these methods.

It goes without saying that the disclosure of a plurality of processes, operations or functions disclosed in the description or in the claims should not be interpreted as being in the specific order, unless this is explicitly or implicitly indicated otherwise, for example, for technical reasons. The disclosure of a plurality of functions therefore does not limit them to a specific order unless the functions are not interchangeable for technical reasons. Furthermore, in some examples, an individual function, process or operation can include a plurality of partial functions, partial processes or partial operations and/or be subdivided into them. Such partial operations can be included and can be part of the disclosure of the individual operation, provided that they are not explicitly excluded.

LIST OF REFERENCE SIGNS

110 Interface
120 Interface
130 Information item
140 Operation
200 Method for a transportation vehicle
210 Receiving a first, second, third and fourth information item
220 Determining a plausibility of the first and third information items
230 Determining a plausibility of the second and fourth information items
240 Processing at least one of the first to fourth information items 300 Transportation vehicle
310 Apparatus
312 One or more interfaces
314 Data processing circuit
410 Interface
420 Interface
430-1 First information item
430-2 Second information item
430-3 Third information item
430-4 Fourth information item
440 Processing operation
500 Method
510 Receiving at least one information item
520 Receiving trustworthiness information
530 Processing the at least one information item
600 Transportation vehicle
610 Apparatus
612 One or more interfaces
614 Data processing circuit
700 Method
710 Receiving at least one information item
720 Determining a trustworthiness
730 Storing the transportation vehicle
800 Server
812 One or more interfaces
814 Data processing circuit
910 Transportation vehicle
920 Server
922 Database
930 Transportation vehicle
931 Operation
932 Storage device
933 Operation
934 Local database
935 Processing operation
936a Higher safety level
936b Lower safety level
938a Safety-critical/intervening functions
938b Non-safety-critical functions

The invention claimed is:

1. A method for a transportation vehicle, the method comprising:
receiving a first information item and a second information item about surroundings of the transportation vehicle via a first communication connection, and a third information item and a fourth information item about the surroundings of the transportation vehicle via a second communication connection, wherein the first information item and the third information item are different from one another, and wherein the second information item and the fourth information item are different from one another;
determining a plausibility of the first information item and of the third information item by comparing the first information item with the third information item based on whether there is agreement between the first information item and the third information item regarding a state of the transportation vehicle such that a determination is made whether an information source for the first information and/or the third is trustworthy to provide information that has not been manipulated prior to receipt;
determining a plausibility of the second information item and of the fourth information item by comparing the second information item and the fourth information item based on whether there is agreement between the second information item and the fourth information item regarding a state of the transportation vehicle such that a determination is made whether an information source for the second information and/or the fourth is trustworthy to provide information that has not been manipulated prior to receipt;
processing at least one of the first to fourth information items based on the determined plausibility of the first to fourth information items such that only plausible information is used as a basis for controlling functions of the transportation vehicle; and
controlling the transportation vehicle based on the plausible information.

2. The method of claim 1, wherein the first communication connection is a communication connection via a local wireless network and/or the second communication connection is a communication connection via a cellular network.

3. The method of claim 1, comprising receiving the first to fourth information items from a same node of a traffic communication network.

4. The method of claim 3, wherein the node is another transportation vehicle or a traffic infrastructure object.

5. The method of claim 1, wherein the processing of the at least one of the first to fourth information items comprises processing at least one of the first to fourth information items by a driving assistance system based on the determined plausibility of the first to fourth information items.

6. The method of claim 1, wherein the first to fourth information items each comprise a time stamp including information about a point in time at which the corresponding first to fourth information items were generated, and wherein determining the plausibility of the first to fourth information items comprises determining the plausibility using the time stamps.

7. A non-transitory computer readable medium including a computer program comprising a program code for performing the method of claim 1 when the program code is executed on a computer, a processor, a data processing circuit, a control module or a programmable hardware component.

8. An apparatus for a transportation vehicle, the apparatus comprising:
one or more interfaces for communication; and
a data processing circuit,
wherein the one or more interfaces are configured to receive a first information item and a second information item about surroundings of the transportation vehicle via a first communication connection, and a third information item and a fourth information item about the surroundings of the transportation vehicle via a second communication connection, wherein the first information item and the third information item are different from one another, and wherein the second information item and the fourth information item are different from one another, and
wherein the data processing circuit is configured to determine a plausibility of the first information item and of the third information item by comparing the first information item with the third information item based on whether there is agreement between the first information item and the third information item regarding a state of the transportation vehicle such that a determination is made whether an information source for the first information and/or the third is trustworthy to provide information that has not been manipulated prior to receipt,
wherein the data processing circuit is further configured to determine a plausibility of the second information item and of the fourth information item by comparing the second information item and the fourth information item based on whether there is agreement between the second information item and the fourth information item regarding a state of the transportation vehicle such that a determination is made whether an information source for the second information and/or the fourth is trustworthy to provide information that has not been manipulated prior to receipt, wherein the data processing circuit is further configured to process at least one of the first to fourth information items in accordance with the determined plausibility of the first to fourth information items such that only plausible information is used as a basis for controlling functions of the transportation vehicle, and wherein the transportation vehicle is controlled based on the plausible information.

9. A transportation vehicle comprising the apparatus of claim 8.

10. The apparatus of claim 8, wherein the first communication connection is a communication connection via a local wireless network and/or the second communication connection is a communication connection via a cellular network.

11. The apparatus of claim 8, wherein the one or more interfaces are configured to receive the first to fourth information items from a same node of a traffic communication network.

12. The apparatus of claim 11, wherein the node is another transportation vehicle or a traffic infrastructure object.

13. The method of claim 1, wherein the processing of the at least one of the first to fourth information items comprises processing at least one of the first to fourth information items by a driving assistance system based on the determined plausibility of the first to fourth information items.

14. The apparatus of claim 8, wherein the first to fourth information items each comprise a time stamp including information about a point in time at which the corresponding first to fourth information items were generated, and wherein determining the plausibility of the first to fourth information items comprises determining the plausibility using the time stamps.

* * * * *